United States Patent
Weichenberger et al.

(10) Patent No.: US 12,535,568 B2
(45) Date of Patent: Jan. 27, 2026

(54) DATA TRANSFER ON ULTRASOUND PROBE SIGNAL WIRES

(71) Applicant: GE Precision Healthcare LLC, Waukesha, WI (US)

(72) Inventors: Harald Weichenberger, Oberhofen am Irrsee (AT); Reinhold Brüstle, Frankenburg am Hausruck (AT)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 38 days.

(21) Appl. No.: 18/536,055

(22) Filed: Dec. 11, 2023

(65) Prior Publication Data

US 2025/0189644 A1 Jun. 12, 2025

(51) Int. Cl.
*G01S 7/52* (2006.01)
*G01S 15/89* (2006.01)

(52) U.S. Cl.
CPC .......... *G01S 7/5208* (2013.01); *G01S 7/5202* (2013.01); *G01S 7/52028* (2013.01); *G01S 15/8993* (2013.01)

(58) Field of Classification Search
CPC .. G01S 7/5208; G01S 7/5202; G01S 7/52028; G01S 15/8993
See application file for complete search history.

(56) References Cited

U.S. PATENT DOCUMENTS

| | | | |
|---|---|---|---|
| 8,157,738 B2 * | 4/2012 | Wegener | A61B 8/483 600/443 |
| 2003/0083597 A1 * | 5/2003 | Vitek | G01S 15/8909 601/2 |
| 2008/0114910 A1 * | 5/2008 | He | G01S 7/52017 710/52 |
| 2010/0305449 A1 * | 12/2010 | Wegener | G01S 7/52034 600/459 |
| 2014/0316269 A1 * | 10/2014 | Zhang | A61B 8/4209 602/1 |
| 2021/0007717 A1 * | 1/2021 | Savord | A61B 8/4444 |
| 2021/0293952 A1 * | 9/2021 | Haque | G01S 15/8925 |
| 2022/0233168 A1 * | 7/2022 | Haque | A61B 8/5207 |

FOREIGN PATENT DOCUMENTS

CN 104688273 A 6/2015

* cited by examiner

*Primary Examiner* — Dixomara Vargas
(74) *Attorney, Agent, or Firm* — McCoy Russell LLP

(57) ABSTRACT

Methods and systems are provided for increasing a data transfer rate and an amount of digital data that may be transmitted to a probe of an ultrasound system, including beam setup data used by modern electronic four-dimensional (e4D) probes to generate a transmit signal. Transmit/receive channels of a cable coupling the probe to the console may be used to send the digital data when not in use. In particular, the digital data may be transmitted during a window of time at the end of a receive mode, after a receive signal has been received and prior to initiating a transmit signal of a subsequent transmit/receive cycle. In some embodiments, a use of the transmit/receive channels for different types of data may be controlled using a switch. In other embodiments, a pulser of the ultrasound system may be advantageously used to encode and transmit the digital data.

15 Claims, 10 Drawing Sheets

202 – PROBE
204, 205, 206, 207 – ASIC
208 – CONNECTOR
210 – T/R SWITCH
212 – FPGA
214 – TX GENERATOR (PULSER)
216 – CHANNEL ELECTRONICS
217 – DISPLAY DEVICE

202 – PROBE
204, 205, 206, 207 – ASIC
208 – CONNECTOR
210 – T/R SWITCH
212 – FPGA
214 – TX GENERATOR (PULSER)
216 – CHANNEL ELECTRONICS
217 – DISPLAY DEVICE

202 – PROBE
204, 205, 206, 207 – ASIC
208 – CONNECTOR
210 – T/R SWITCH
212 – FPGA
214 – TX GENERATOR (PULSER)
216 – CHANNEL ELECTRONICS
217 – DISPLAY DEVICE

202 – PROBE
204, 205, 206, 207 – ASIC
208 – CONNECTOR
210 – T/R SWITCH
212 – FPGA
214 – TX GENERATOR (PULSER)
216 – CHANNEL ELECTRONICS
217 – DISPLAY DEVICE

DATA TRANSFER ON ULTRASOUND PROBE SIGNAL WIRES

TECHNICAL FIELD

Embodiments of the subject matter disclosed herein relate to ultrasound imaging.

BACKGROUND

Clinical ultrasound is an imaging modality that employs ultrasound waves to probe the internal structures of a body of a patient and produce a corresponding image. For example, an ultrasound probe comprising a plurality of transducer elements emits ultrasonic pulses which reflect or echo, refract, or are absorbed by structures in the body. The ultrasound probe then receives reflected echoes, which are processed into an image.

The ultrasound probe may include electronics in a handle of the probe, which may rely on a transmission of a large amount of beam setup data from a console of an ultrasound system to the probe. To avoid delays in operating the probe, the data may have to be sent within a short amount of time. Additionally, the amount of data to be transferred may increase in the future.

SUMMARY

The current disclosure at least partially addresses one or more of the above identified issues via an ultrasound imaging system comprising a console including a pulser and a controller; an ultrasound probe coupled to the console via a cable, the cable including a set of transmit/receive channel wires configured to transmit a transmit signal from the pulser to the ultrasound probe during a transmit mode of the ultrasound imaging system, and to transmit a receive signal from the probe to the console during a receive mode of the ultrasound imaging system; and a non-transitory memory storing instructions that when executed, cause the controller to transmit digital data from the console to the probe via the set of transmit/receive channel wires at a time when neither the transmit signal nor the receive signal are being transmitted.

The above advantages and other advantages, and features of the present description will be readily apparent from the Detailed Description below when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
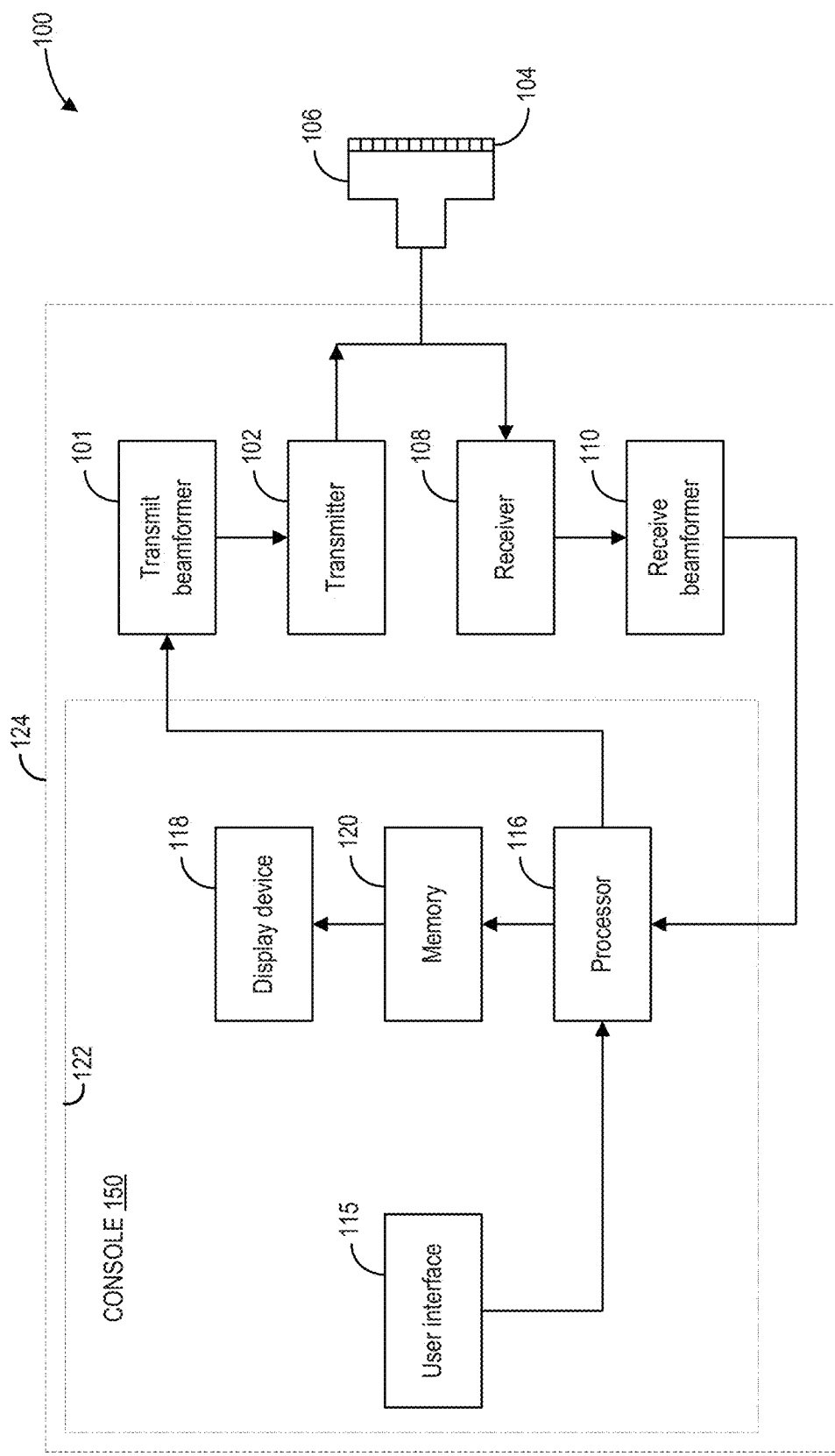
FIG. 1 shows a block diagram of an exemplary embodiment of an ultrasound system.

Clinical ultrasound imaging typically includes the placement of an ultrasound probe of an ultrasound imaging system, including one or more transducer elements onto an imaging subject, such as a patient, at the location of a target anatomical feature (e.g., abdomen, chest, etc.). Images are acquired by the ultrasound probe and are displayed on a display device in real time or near real time (e.g., the images are displayed once the images are generated and without intentional delay). The operator of the ultrasound probe may view the images and adjust various acquisition parameters and/or the position of the ultrasound probe in order to obtain high-quality images of the target anatomical feature (e.g., the heart, the liver, the kidney, etc.). The acquisition parameters that may be adjusted include transmit frequency, transmit depth, gain (e.g., time gain compensation), beam steering angle, beamforming strategy, and/or other parameters.

During operation of an ultrasound imaging system, transmit signals are typically generated and transmitted to the probe via coaxial cables. A transmit signal refers to a signal comprising a plurality of pulses of high-frequency, high voltage ultrasound energy used to generate an acoustic wave via transducer elements of the probe, which is projected into the imaging subject. The acoustic wave may be reflected back, for example, from anatomical structures of a patient. The reflected acoustic wave may be received by the transducer elements, which may generate a receive signal. The receive signal may be transmitted via the coaxial cables back to the ultrasound imaging system, which may process the receive signal to generate an ultrasound image.

Some ultrasound probes, such as electronic four-dimensional (e4D) probes, may generate the transmit signal at the probe, rather than sending the transmit signal to the probe via the coaxial cables. For the purposes of this disclosure, the term e4D probe is intended to encompass any probes that include electronics such as Application Specific Integrated Circuits (ASICs) in a handle of the probe to generate the transmit signal. The electronics may rely on data being transferred from the ultrasound imaging system to the probe handle during operation of the probe, and may also send data from the probe to the ultrasound imaging system. The data sent to the probe may include beam setup data (e.g., instructions for generating the transmit signal). The data may also include multiplexer configuration data specifying, for example, how and/or when signals from a plurality of transducer elements are transmitted to a single channel of a console of the ultrasound system. The data sent from the probe to the ultrasound imaging system may include a confirmation of receiving information, sensor data (e.g., indicating an orientation of the probe, or whether the probe has been dropped), and/or other data. The data is typically sent as a digital signal via dedicated wires. However, if an amount of the data exceeds a threshold amount, a bottleneck may occur where delays are incurred due to slow data transfer speeds. The amount of data may also increase as newer generation probes and ASICs are created, which may rely on an increased amount of information.

To avoid the delays incurred by the slow data transfer speeds, systems and methods are proposed herein to transmit some or all of the beam setup data and other data mentioned above to the probe via the coaxial cables, during times when the coaxial cables are not being used to send the transmit signals to the probe or to send the receive signals from the probe to the ultrasound system. For e4D probes, because the transmit signal is generated at the probe, the coaxial cables could be used for data transfer during a transmit phase. For both e4D probes and standard probes, the coaxial cables could be used for data transfer during a short time at the end of the receive signal and prior to sending a subsequent transmit signal. By leveraging the greater number of parallel wires in the coaxial cables to transmit the digital data rather than using the dedicated wires, a time taken to send the digital data to the probe may be reduced, reducing or eliminating delays in the data transfer. Additionally, transmitting the digital data via the coaxial cables may reduce constraints on the amount of data that may be transferred, allowing for the use of newer probes and ASICs that may rely on an increased amount of beam setup data and other data.

Referring now to FIG. 1, a schematic diagram of an ultrasound imaging system 100 in accordance with an embodiment of the disclosure is shown. The probe 106 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body of a patient (not shown). The probe 106 may be a one-dimensional transducer array probe, or may be a two-dimensional matrix transducer array probe. The transducer elements 104 may be comprised of a piezoelectric material, such as lead zirconate titanate (PZT), lead magnesium niobate-lead titanate (PMN-PT), single crystal PMN-PT (PIN-PMN-PT), or a different piezoelectric material. It should be appreciated that the examples provided herein are for illustrative purposes and a different type of piezoelectric material may be used without departing from the scope of this disclosure. When a voltage is applied to a piezoelectric crystal, the crystal physically expands and contracts, emitting an ultrasonic spherical wave. In this way, transducer elements 104 may convert electronic transmit signals into acoustic transmit beams.

After the elements 104 of the probe 106 emit pulsed ultrasonic signals into a body (of a patient), the pulsed ultrasonic signals are back-scattered from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data to a processor 116 (e.g., also herein described as controller 116) to be displayed on a display device 118. Additionally, transducer element 104 may produce one or more ultrasonic pulses to form one or more transmit beams in accordance with the received echoes. The terms "scan" or "scanning" may also be used in this disclosure to refer to acquiring data through the process of transmitting and receiving ultrasonic signals.

Components of the ultrasound imaging system 100 shown in FIG. 1 may be included in a console 150, or may be included in the probe 106, where the probe 106 may be electronically coupled to the console 150 via a cable. In some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106, where the console 150 may include the components depicted within dotted lines 122. In other embodiments, the console 150 may include the transmit beamformer 101, the transmitter 102, the receiver 108, and the receive beamformer 110, where the console 150 may include the components depicted within dashed lines 124. It should be appreciated that the ultrasound imaging system 100 depicted in FIG. 1 is for illustrative purposes, and in other embodiments the ultrasound imaging system 100 may include a greater or lesser number of components located either in the probe 106 or the console 150.

The console 150 may include a user interface 115, which may be used to control operation of the ultrasound imaging system 100. The user interface 115 may include one or more of the following: a rotary element, a mouse, a keyboard, a trackball, hard keys linked to specific actions, soft keys that may be configured to control different functions, and/or a graphical user interface displayed on the display device 118.

The processor 116 may control the transmit beamformer 101. The processor 116 is in electronic communication (e.g., communicatively connected) with the probe 106. The term "electronic communication" may be defined to include both wired and wireless communications, although, for purposes of this disclosure, the probe 106 may be coupled to the console 150 via a first set of wires used to send a transmit signal to transmit beamformer 101, and a second set of wires used to receive a receive signal from receive beamformer 110 (e.g., the cable). The processor 116 may control the probe 106 to acquire data according to instructions stored on a memory 120.

As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be standalone or as part of a computing device. Examples of computer memory may include any other medium which can be used to store the desired electronic format of information and which can be accessed by the processor or processors or at least a portion of a computing device.

The processor 116 and the transmit beamformer 101 control which of the elements 104 are active and the shape of a beam emitted from the probe 106. The processor 116 is in electronic communication with the display device 118, and the processor 116 may process the data (e.g., ultrasound data) into images for display on the display device 118. The processor 116 may include a central processor (CPU) and/or graphic processing units (GPU), according to an embodiment. According to other embodiments, the processor 116 or transmit beamformer 101 may include other electronic components capable of carrying out processing functions, such as a field-programmable gate array (FPGA). According to other embodiments, the processor 116 may include multiple electronic components capable of carrying out processing functions. For example, the processor 116 may include two or more electronic components selected from a list of electronic components including: a central processor, a digital signal processor, an FPGA, and a graphic board. According to another embodiment, the processor 116 may also include a complex demodulator (not shown) that demodulates the RF data and generates raw data. In another embodiment, the demodulation can be carried out earlier in the processing chain (e.g. receive beamformer 110).

The processor 116 may be adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time rate of 7-20 frames/sec. Some embodiments of the invention may include multiple processors (not shown) to handle the processing tasks that are handled by processor 116 according to the exemplary embodiment described hereinabove. For example, a first processor may be utilized to demodulate and decimate the RF signal while a second processor may be used to further process the data, for example by augmenting the data as described further herein, prior to displaying an image. It should be appreciated that other embodiments may use a different arrangement of processors.

The ultrasound imaging system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds' worth of frames of ultrasound data. The frames of data are stored in a manner to facilitate retrieval thereof according to its order or time of acquisition. The memory 120 may comprise any known data storage medium.

In various embodiments of the present disclosure, data may be processed in different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

After performing a two-dimensional ultrasound scan, a block of data comprising scan lines and their samples is generated. After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (e.g., pixels) in the resulting image. These missing pixels occur because each element of the two-dimensional block should typically cover many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of poor or low resolution, especially for areas of greater depth.

In embodiments where the transmit beamformer 101 is included in the console 150 and not in the probe 106, the ultrasound imaging system 100 may be configured to transmit a signal from transmit beamformer 101 to the probe 106 for operating the probe 106. In embodiments where the transmit beamformer 101 is included in the probe 106 and not in the console 150, the ultrasound imaging system 100 may be configured to transmit beam setup data from the processor 116 (e.g., and/or from an FPGA of the processor 116) to transmit beamformer 101 for operating probe 106. The beam setup data may be transmitted as low voltage digital signals, as opposed to the high voltage transmit signal. A dedicated set of wires may be used for such purposes. However, a number of wires in the dedicated set of wires may be small (e.g., four), and an amount of beam setup data transmitted from the processor 116 may be large, which may cause delays in operating probe 106 due to slow data transfer rates. As described in greater detail below in reference to FIG. 2, to increase a speed of the data transfer, the second set of wires used for sending transmit and receive signals from the probe 106 to and from the ultrasound console 150 may be used to transmit the beam setup data during times when no data is transferred over the wires.

Figure 2:
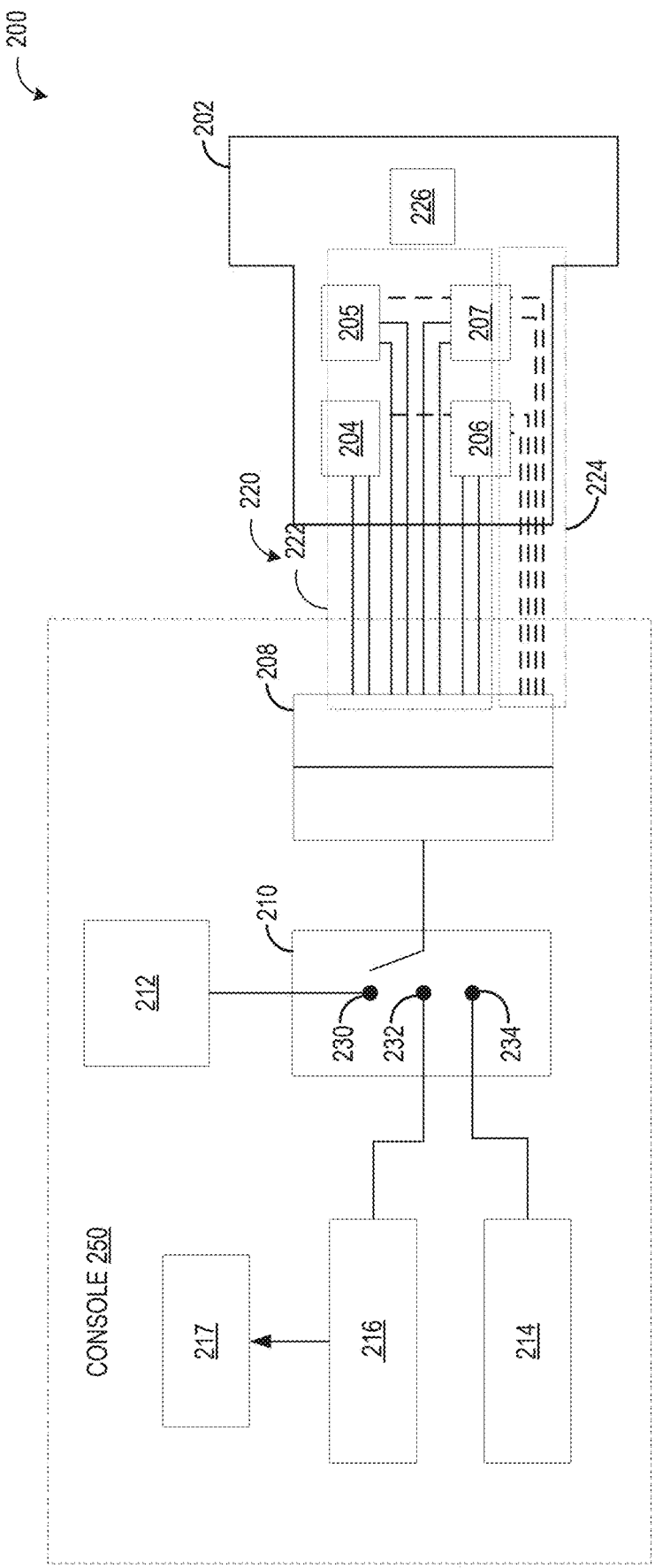
FIG. 2 shows a first exemplary ultrasound probe coupling diagram depicting a probe connected to a console of an ultrasound system via a cable.

FIG. 2 shows a first ultrasound probe coupling diagram 200, which depicts a probe 202 connected to a console 250 of an ultrasound system via a cable 220, where the ultrasound system, probe 202, and console 250 may be non-limiting examples of ultrasound system 100, probe 106, and console 150 of FIG. 1. For the purposes of clarity, some components of the ultrasound system are not depicted in FIG. 2.

The probe 202 may be coupled and electrically connected to the console 250 via a cable 220, which may include a first set of transmit/receive channel wires 222 (e.g., solid lines connecting the probe 202 with the console 250) and a second set of digital data transfer wires 224 (e.g., dashed lines connecting the probe 202 with the console 250). The first set of transmit/receive channel wires 222 may be used to send a transmit signal to transducer elements of the probe to generate an acoustic wave to be projected into a subject, and/or receive a receive signal from the transducer elements based on receiving a reflected acoustic wave from the subject. The second set of digital data transfer wires 224 may be used to send other digital data between the probe and the console. For the purposes of this disclosure, the other digital data refers to, for example, multiplexer information regarding when connections should be closed to different elements, sensor information, beam setup data or processing data of electronical transmit or receive components, motor information and/or other digital data used by the probe 202 not including the transmit signal or the receive signal.

In some embodiments, the probe 202 may be a standard probe, where the probe 202 may not include electronic components for transmitting a transmit signal, but may include receive beamforming electronics (e.g., receive beamformer 110 of FIG. 1) for receiving a receive signal reflected back from anatomies of a patient of the ultrasound system. In such embodiments, the transmit signal may be generated at the console 250 by a transmit signal (Tx) generator 214 (e.g., also described herein as a pulser 214), and sent to the probe 202 via the first set of transmit/receive channel wires 222. The Tx generator 214 may generate high voltage and high frequency signals, in the MHz frequency range, which may be applied to the transducer elements (e.g., elements 104) of standard probes to generate acoustic waves. The receive signal may be generated at the probe 202 and sent to a receive channel electronics 216 of the console 250 via the first set of transmit/receive channel wires 222. The receive channel electronics 216 may generate one or more ultrasound images from the receive signal, and display the one or more ultrasound images on a display device 217 of the console 250.

In other embodiments, the probe 202 may include various electronic components for both transmitting the transmit signal and receiving the receive signal reflected back from anatomies of a patient of the ultrasound system. For example, the probe 202 may be an e4D probe. In such embodiments, the probe 202 may include transmit beamforming electronics (e.g., the transmit beamformer 101 of ultrasound system 100), and the Tx generator 214 may not be used to generate the transmit signal. The transmit signal may be generated at the transmit beamforming electronics of the probe based on instructions generated at an FPGA 212 to the electronics in the probe via the second set of digital data transfer wires 224 used by both standard and e4D probes to transmit digital data between the console and the probe. In some embodiments, the FPGA 212 may be a part of a processor of the ultrasound system (e.g., processor 116 of FIG. 1). In other embodiments, the FPGA 212 may be a part of the transmit beamforming electronics.

The transmit and receive beamforming electronics of the probe 202 may include one or more Application Specific Integrated Circuits (ASIC). In FIG. 2, four ASICs are depicted: a first ASIC 204, a second ASIC 205, a third ASIC 206, and a fourth ASIC 207. In other embodiments, the probe 202 may include a different number of ASICs. ASICs 204-207 may be coupled to both of the first set of transmit/receive channel wires 222 (e.g., to control the transmission of the receive signals) and the second set of digital data transfer wires 224 (e.g., to receive transmit beamforming instructions).

The first set of transmit/receive channel wires 222 and the second set of digital data transfer wires 224 and may be bundled together in the cable 220. The first set of transmit/receive channel wires 222 may include a first number of channels (e.g., wires), and the second set of digital data transfer wires 224 may include a second number of channels, where the first number may be different from the second number. In particular, the first number of channels may be greater than the second number of channels. For example, in one embodiment, the second set of digital data transfer wires 224 may include four channels, and a number of channels of the first set of transmit/receive channel wires 222 may depend on a number of elements (e.g., elements 104 of FIG. 1) included in the probe 202.

Each wire/channel may comprise a separate coaxial cable. For example, the probe 202 may include 192 elements, and the first set of transmit/receive channel wires 222 may include a corresponding 192 receive channels. Alternatively, the probe 202 may include 256 elements, and a multiplexer 226 may be used to drive the 256 elements via the 192 channels. Further, in some embodiments, the probe 202 may be an e4D probe including several thousand elements. Because the multiplexer 226 may not be able to drive such a high number of elements, the ASICs 204-207 may control a transmission of receive signals from the high number of elements to the processor.

In the e4D probes, each ASIC of the ASICs 204-207 may include a digital communication part for receiving the instructions for generating the transmit signals (e.g., beam setup data); a pre-beamforming part for controlling transmit and receive signals; and a pulser, which may be used to apply electrical signals to the transducer elements (e.g., as opposed to the Tx generator 214, which is used for standard probes). The ASICs 204-207 may determine which signals should be applied to which transducer elements. The number of ASICs may depend on a detailed design of the ASICs and a number of elements of the probe 202. The electronics inside the ASICs may be designed in a way to read and write data at specific times and to switch between transmitting the receive signal to the console 250 and receiving the beam setup data. The beam setup data may be transmitted from a processor of the ultrasound system to the ASICs 204-207 via the second set of digital data transfer wires 224. Specifically, the beam setup data may be transmitted from the FPGA 212 to the ASICs 204-207. However, an amount of beam setup data may be large, and as a result, transmitting the beam setup data via the second set of digital data transfer wires 224 may incur delays when operating the e4D probe, which may result in delays updating a display of the one or more ultrasound images on the display device 217.

To avoid the delays, some or all of the beam setup data may be advantageously transmitted from the FPGA 212 to the ASICs 204-207 via the first set of transmit/receive channel wires 222, during times when the first set of transmit/receive channel wires 222 are not transmitting either the transmit signal from the Tx generator 214 to the ASICs 204-207 or the receive signal from the ASICs 204-207 to the console 250. Specifically, the first set of transmit/receive channel wires 222 may be used to transmit some or all of the beam setup data during a short duration at the end of a preceding receive phase of the ultrasound system, while waiting for an acoustic signal to be reflected back from the patient, and prior to generating a next transmit signal. Because the transmit/receive channel wires 222 include a much greater number of wires than the digital data transfer wires 224, by sending the beam setup data from the FPGA 212 to the ASICs 204-207 in parallel via the transmit/receive channel wires 222, a time taken to transmit the beam setup data may be reduced.

For embodiments where the probe 202 is a standard probe not including the beamforming electronics in the probe, the Tx generator 214 may be used to generate the transmit signal, and the transmit signal may be transmitted to the probe 202 via the first set of transmit/receive channel wires 222. For embodiments where the probe 202 is an e4D probe, the beam setup data may be additionally or alternatively transmitted to the probe 202 via the first set of transmit/receive channel wires 222 during a transmit phase, because no transmit signal is transmitted from Tx generator 214 via the first set of transmit/receive channel wires 222.

The console 250 may include a transmit/receive (T/R) switch 210 connected to the first set of transmit/receive channel wires 222 and the second set of digital data transfer wires 224 of the cable 220 via a connector 208. T/R switch 210 may be controlled to switch between a transmit mode, when the transmit signal is sent from the console to the probe via the first set of transmit/receive channel wires, and a receive mode, when the receive signal is sent from the probe to the console via the first set of transmit/receive channel wires. T/R switch 210 may be operated by a controller of the ultrasound system (e.g., processor/controller 116).

To transmit the beam setup data from the console 250 to the probe 106 via the first set of transmit/receive channel wires 222 when the first set of transmit/receive channel wires 222 are not being used, T/R switch 210 may be advantageously configured to include a third position, for a third, digital data transmit mode. Specifically, T/R switch 210 may include a first position 230, where when T/R switch 210 is in first position 230, the ultrasound system may be in the digital data transmit mode, and digital data (including the beam setup data) may be transmitted from FPGA 212 to probe 202 via connector 208 and the first set of transmit/receive channel wires 222. T/R switch 210 may include a second position 232, where when T/R switch 210 is in second position 232, the ultrasound system may be in the receive mode, and the receive signal may be transmitted from the probe 202 to the receive channel electronics 216 via connector 208 and the first set of transmit/receive channel wires 222, to be displayed on the display device 217. T/R switch 210 may include a third position 234, where when T/R switch 210 is in third position 234, the ultrasound system may be in the transmit mode, and the transmit signal may be transmitted from the Tx generator 214 to the probe 202 via connector 208 and the first set of transmit/receive channel wires 222 (e.g., for standard probes that do not include transmit beamforming electronics). In this way, by actuating the T/R switch 210 between first position 230, second position 232, and third position 234, the transmit signal may be communicated to standard probes, the receive signal may be communicated to the receive channel electronics 216, and the first set of transmit/receive channel wires 222 may be advantageously used to transfer the beam setup data to the probe 202 for e4D probe embodiments where the transmit signals are generated by the ASICs 204-207.

Figure 3:
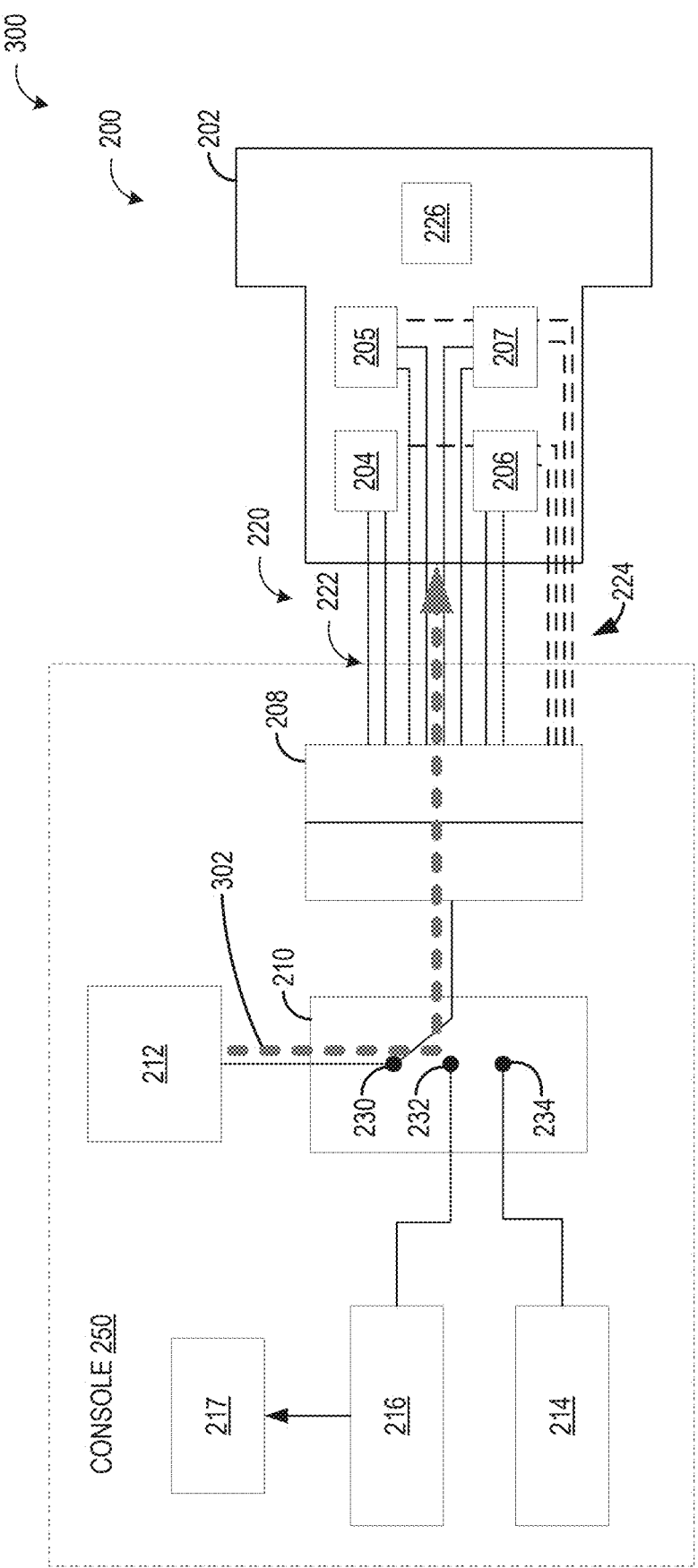
FIG. 3 shows a first flow of data between the console and the probe of the first exemplary ultrasound probe coupling diagram.
Figure 4:
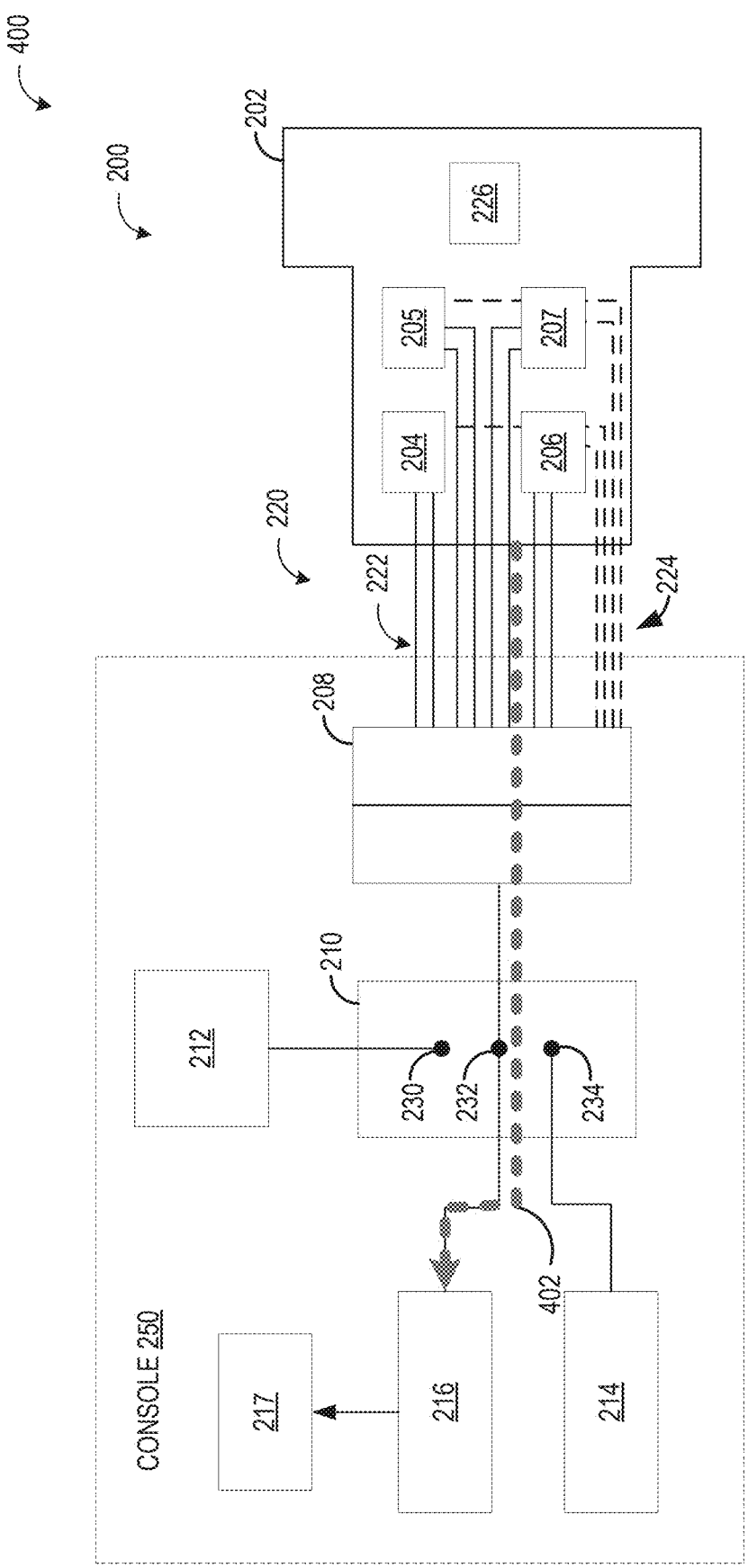
FIG. 4 shows a second flow of data between the console and the probe of the first exemplary ultrasound probe coupling diagram.
Figure 5:
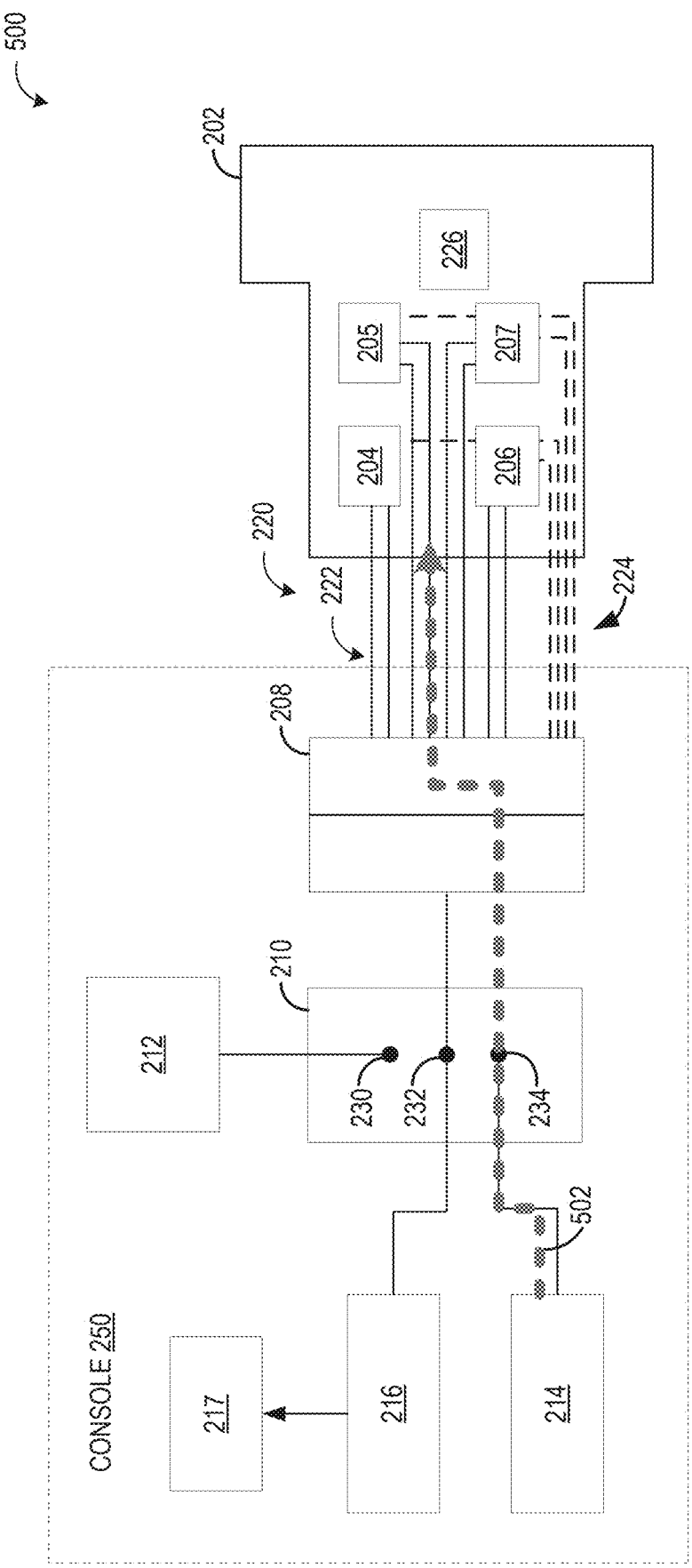
FIG. 5 shows a third flow of data between the console and the probe of the first exemplary ultrasound probe coupling diagram.

An example of how the T/R switch 210 may be adjusted during operation of the probe 202 is shown in FIGS. 3-5. FIG. 3 shows a first state 300 of the ultrasound system, where the T/R switch 210 may be actuated to the first position 230 during the digital data transmit mode to transfer beam setup data for a first transmit signal via the first set of transmit/receive channel wires 222. A bolded dashed line 302 indicates a first flow of data (e.g., the beam setup data, and other digital data) from FPGA 212 to the probe 202. FIG. 4 shows a second state 400 of the ultrasound system, where the T/R switch 210 is actuated to the second position 232 during the receive mode to receive the receive signal from the probe 202 via the first set of transmit/receive channel wires 222. A bolded dashed line 402 indicates a second flow of data (e.g., the receive signal) from the probe 202 to the receive channel electronics 216. After the receive signal is received, the T/R switch 210 may be actuated back to the first position 230, to transmit beam setup data from the FPGA 212 to the probe 202 for a second transmit signal (FIG. 3). FIG. 5 shows a third state 500 of the ultrasound system used for standard probes, where the T/R switch 210 may be actuated to the third position 234 to transmit a transmit signal from the Tx generator 214 to the probe 202 during the transmit mode via the first set of transmit/receive channel wires 222. A bolded dashed line 502 indicates a third flow of data (e.g., the transmit signal) from the Tx generator 214 to the probe 202.

In this way, for e4D probes, the T/R switch 210 may be used to allow the beam setup data, and other digital data used by the probe 202, to be transmitted by the more numerous, higher voltage first set of transmit/receive channel wires 222 rather than the less numerous, lower voltage second set of digital data transfer wires 224. The other digital data may include, for example, information for a multiplexer (e.g., multiplexer 226) about when connections should be closed to different elements, information relevant to one or more sensors of the probe configured to detect configurations, orientations, or drops of the probe, and/or other digital data not related to beamforming. By transmitting the beam setup data over the first set of transmit/receive channel wires 222, delays in the operation of the probe 202 due to slow data transfer over the second set of digital data transfer wires 224 may be reduced or eliminated, and a bottleneck that may limit an amount of beam setup data that can be transmitted to the probe 202 in real time may be eliminated, allowing the amount of beam setup data to be increased in the future. Further, by using the higher voltage first set of transmit/receive channel wires 222 to transfer the beam setup data rather than the second set of digital data transfer wires 224, the second set of digital data transfer wires 224 may be eliminated, reducing a cost of the probe 202 and a cost of the ultrasound system overall.

For standard (e.g., non-e4D) probes, the T/R switch 210 protects the receive channel electronics 216 from the high voltage transmit signal. After the high voltage transmit signal is sent, the T/R switch 210 is actuated to switch from the pulser output (from the Tx generator 214) to a receive circuit input (to the receive channel electronics 216).

Figure 6:
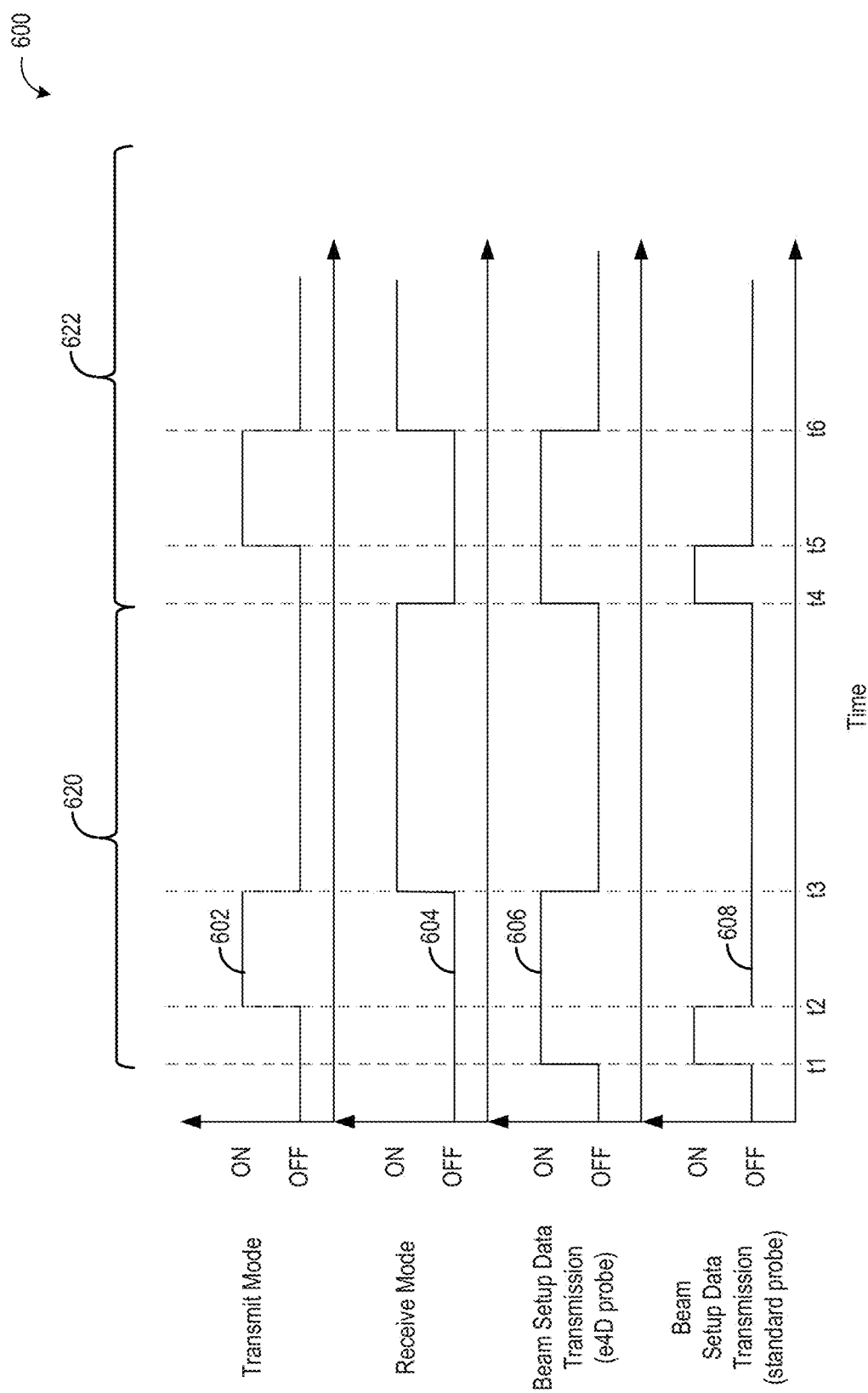
FIG. 6 shows an exemplary timing diagram indicating a timing of events during operation of the probe.

Referring now to FIG. 6, an exemplary timing diagram 600 shows a timing of a sequence of events during an operation of a probe of an ultrasound system, such as probe 106 of ultrasound system 100 and/or probe 202 of the first ultrasound probe coupling diagram 200, where the probe may be an e4D probe including beamforming electronics located in the probe, or a standard (e.g., non-e4D) probe not including the beamforming electronics in the probe. The operation of the probe may include a plurality of consecutive transmit/receive cycles, where during each transmit/receive cycle, an acoustic transmit signal is projected into a patient of the ultrasound system and an acoustic receive signal is received from the patient as a reflection of the acoustic transmit signal. In FIG. 6, the operation of the probe is shown during two consecutive transmit/receive cycles of the ultrasound system, a first transmit/receive cycle 620 and a second transmit/receive cycle 622. Time is shown on a horizontal axis of timing diagram 600, and time points of interest during the first sequence of events are illustrated by vertical dashed lines.

Timing diagram 600 shows four plots. A first plot 602 illustrates when the ultrasound system is in a transmit mode, when a transmit signal is generated at the probe and transmitted into a patient of the ultrasound system, where the transmit mode may be ON or OFF. A second plot 604 illustrates when the ultrasound system is in a receive mode, when the acoustic receive signal is being received at the probe and transmitted back to the ultrasound system, where the receive mode may be ON or OFF. A third plot 606 illustrates when beam setup data and other digital data of the ultrasound system may be transmitted from a FPGA (e.g., FPGA 212 of FIG. 2) of the ultrasound system to an e4D ultrasound probe, where the transmission of the beam setup data and other digital data may be ON or OFF. The beam setup data may be used to configure the acoustic transmit signal prior to projecting the acoustic transmit signal into the patient. A fourth plot 608 illustrates when beam setup data of the ultrasound system may be transmitted from the processor to a standard ultrasound probe, where the transmission of the digital data may be ON or OFF. Because the standard ultrasound probe does not generate the transmit signal, an amount of the beam setup data transmitted to the ultrasound probe may be less (e.g., multiplexer information regarding when connections should be closed to different elements, and/or other digital data not related to beamforming).

At a time t0, the ultrasound system may be off, whereby the ultrasound system may not be in either of the transmit mode or the receive mode.

At a time t1, beam setup data used by e4D probes to generate a first acoustic transmit signal and the other digital data may be sent from the FPGA to the probe, as indicated by plot 606, to initiate the first transmit/receive cycle 620. For standard probes, the other digital data may be sent from the FPGA to the probe to initiate the first transmit/receive cycle 620, as indicated by plot 608.

Between time t1 and a time t2, the beam setup data and other digital data may be transmitted via a set of transmit/receive channel wires of a cable coupling the probe to a console of the ultrasound system (e.g., the first set of transmit/receive channel wires 222), which may not be in use between t1 and t2 for transmitting the transmit signal during a transmit mode. The beam setup data may be received at one or more ASICs of the probe (e.g., the ASICs 204-207), which may process instructions in the beam setup data for controlling the transmit signal.

At time t2, an electrical transmit signal is supplied to the probe to generate a first acoustic transmit signal, and the transmit mode is initiated as the first acoustic transmit signal is generated by the probe and transmitted into the patient. For the e4D probes, the transmit signal is generated at the probe. For standard probes, the transmit signal is generated at a console of the ultrasound system and sent to the probe via the set of transmit/receive channel wires.

Between time t2 and a time t3, the ultrasound system is in the transmit mode, as indicated by plot 602. For example, the time between t2 and t3 when the ultrasound system is in the transmit mode may be 10-20 microseconds. The beam setup data may be transmitted to e4D probes via the set of transmit/receive channel wires during the transmit mode, as indicated by plot 606. However, in the case of standard probes, the beam setup data may not be transmitted via the set of transmit/receive channel wires during the transmit mode, because the set of transmit/receive channel wires may be used to transmit the transmit signal from a pulser located in the console (e.g., the Tx generator 214).

At time t3, the transmit mode ends, and the acoustic transmit signal is not generated. Between time t3 and a time t4, the ultrasound system is in the receive mode, as indicated by plot 604, where the ultrasound system may be receiving or waiting for a first acoustic receive signal to be received, where the first acoustic receive signal is a reflection of the first acoustic transmit signal of internal anatomical structures of the patient. During the receive mode, the first acoustic receive signal is received at the probe and transmitted to the console of the ultrasound system, via the receive wires. Receiving the first acoustic receive signal may take longer than transmitting the first acoustic transmit signal, because portions of the first acoustic receive signal coming from a deepest echo from a deepest set of tissues of the patient may take time. For example, based on 150 mm of image depth, the first acoustic receive signal may take 200 microseconds to be received.

At time t4, the first acoustic receive signal has been fully received and the receive mode ends, the first transmit/receive cycle 620 ends and the second transmit/receive cycle 622 begins. Between time t4 and a time t5, as a result of the first acoustic receive signal being fully received, the set of transmit/receive channel wires may not be in use, whereby the set of transmit/receive channel wires may be used to transmit a second set of beam setup data (and other digital data) to generate a second acoustic transmit signal from the FPGA to the probe to initiate the second transmit/receive cycle 622. The second set of beam setup data may be processed by the ASICs of the probe prior to transmitting the transmit signal.

At time t5, the transmit mode is initiated as a second acoustic transmit signal is generated by the probe, based on the second set of beam setup data, and transmitted into the patient. Between time t5 and a time t6, the ultrasound system is in the transmit mode, as indicated by plot 602. During the transmit mode, as described above, the beam setup data may continue to be transmitted to e4D probes via the receive wires, as indicated by plot 606. However, during the transmit mode, no beam setup data may be transmitted to standard probes via the set of transmit/receive channel wires, as indicated by plot 608.

At time t6, the transmit mode ends, and the acoustic transmit signal is not generated. The receive mode is initiated, during which a second acoustic receive signal may be received and transmitted to the console of the ultrasound system, via the receive wires.

Thus, as shown by plots 602 and 604 during each transmit/receive cycle, the ultrasound system oscillates between the transmit mode and the receive mode. However, there might be a portion of each transmit/receive cycle at the end of the receive mode where an acoustic receive signal has been fully received, and the transmit mode has not yet started. During the portion, no data is being transmitted from receive beamforming electronics of the probe to the console via the set of transmit/receive channel wires. As a result, the set of transmit/receive channel wires may be advantageously used to transmit the beam setup data used to configure a respective upcoming transmit signal for e4D probes, and other digital information used by standard probes. Additionally, for e4D probes, the beam setup data may be transmitted over the set of transmit/receive channel wires during the transmit mode.

In some embodiments, all of the beam setup data used for configuring the first and second acoustic transmit signals may be sent via the set of transmit/receive channel wires in this manner. In other embodiments, a first portion of the beam setup data may be transmitted via other digital data transfer wires (e.g., the second set of digital data transfer wires 224), and a second portion of the beam setup data may be transmitted via the set of transmit/receive channel wires. The transmission of the beam setup data via the set of transmit/receive channel wires is described in greater detail below in reference to method 900 of FIG. 9.

Figure 9:
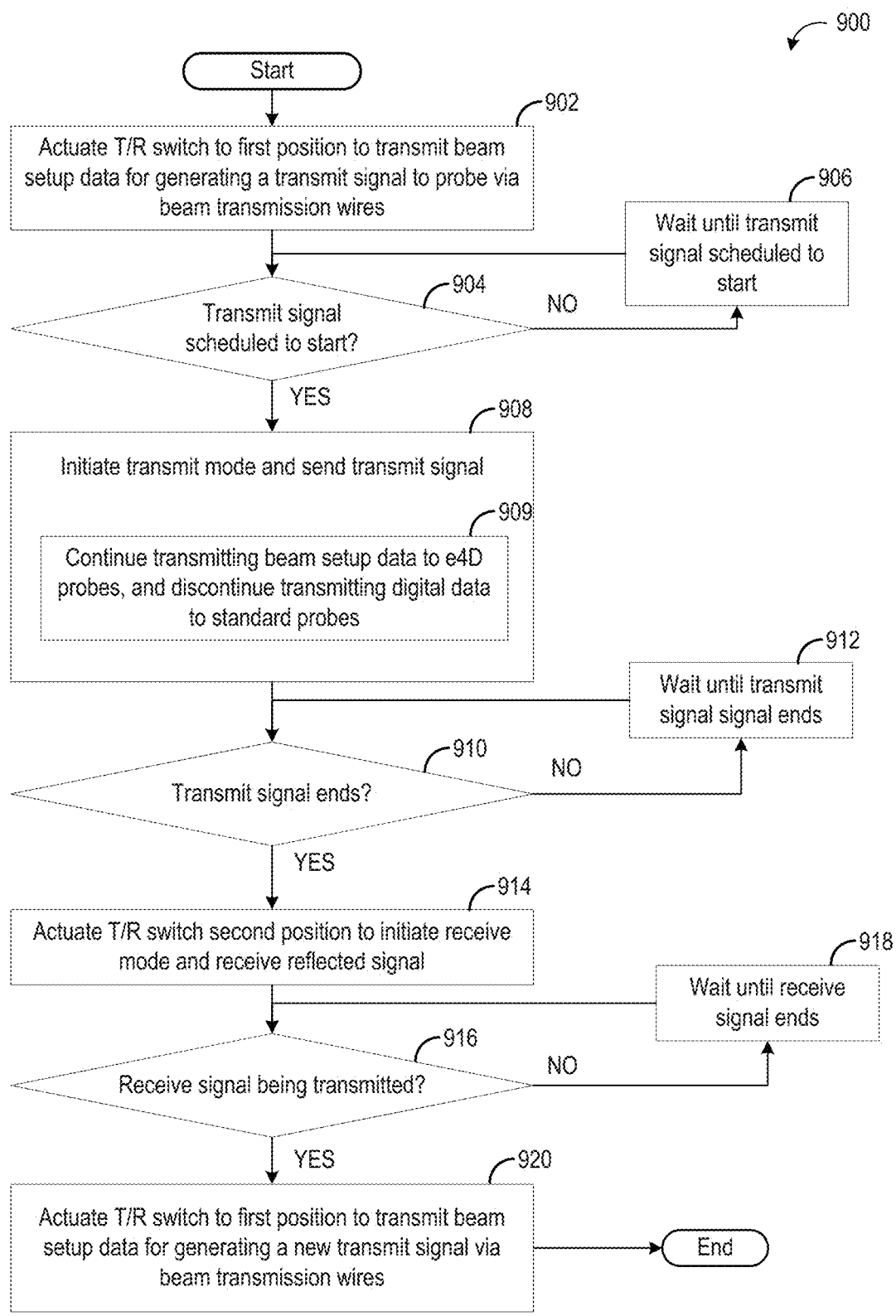
FIG. 9 is a flowchart illustrating a first exemplary method for controlling a flow of data between the console and the probe.

FIG. 9 shows an exemplary method 900 for controlling a T/R switch of an ultrasound system as described above, to advantageously use a set of transmit/receive channels (e.g., the first set of transmit/receive channel wires 222 of FIG. 2) to transmit beam setup data when the transmit/receive channels are not being used to transmit a receive signal generated at a probe of the ultrasound system to a console of the ultrasound system. The ultrasound system may be a non-limiting example of the ultrasound system 100 of FIG. 1, and the T/R switch may be the same as or similar to the T/R switch 210 of FIGS. 2-5. The steps of method 900 may also be applied as described above in relation to timing diagram 600 of FIG. 6. In various embodiments, method 900 may be executed by a processor of the ultrasound system, such as the processor 116 of FIG. 1, and/or an FPGA of the ultrasound system, such as the FPGA 212 of FIG. 2.

Method 900 begins at 902, where method 900 includes actuating the T/R switch to a first position (e.g., first position 230) corresponding to a digital data transmit mode, to transmit beam setup data for generating a transmit signal to the probe via a set of transmit/receive channel wires or channels typically used for transmit/receive signals to and from the probe (e.g., the first set of transmit/receive channel wires 222). A portion of the wires may be used for each ASIC and the data may be transferred in parallel on that portion of wires, in accordance with conventional techniques known in the art. The beam setup data may be received at beamforming electronics of the probe, such as one or more ASICs (e.g., ASICs 204-207) located in a handle of the probe. The beamforming electronics may process the beam setup data to configure an acoustic transmit signal.

At 904, method 900 includes determining whether a transmit signal is scheduled to start. The transmit signal may be scheduled to start at predetermined intervals of a transmit/receive cycle during operation of the ultrasound system. If at 904 it is determined that the transmit signal is not scheduled to start, method 900 proceeds to 906. At 906, method 900 includes waiting until the transmit signal is scheduled to start.

If at 904 it is determined that the transit signal is scheduled to start, method 900 proceeds to 908. At 908, method 900 includes initiating a beam transmit mode, and initiating a transmission of a transmit signal from the probe to a body of a patient or scanned object. In the case of e4D probes, the transmit signal is generated at the probe based on the beam setup data. In the case of standard probes, the transmit signal is generated at a console of the ultrasound system and transmitted to the probe via the set of transmit/receive channel wires.

At 909, method 900 includes maintaining the T/R switch in the first position and continuing to transmit the beam setup data and other digital data to e4D probes via the set of transmit/receive channel wires. However, for standard probes, method 900 includes actuating the T/R switch to a third position (e.g., third position 234) to discontinue transmission of the other digital data to the probe via the set of transmit/receive channel wires, and allow the transit signal to be transmitted to the probe via the set of transmit/receive channel wires.

At 910, method 900 includes determining whether the transmit signal has ended. If at 910 it is determined that the transmit signal has not ended, method 900 proceeds to 912. At 912, method 900 includes waiting until the transmission of the transmit signal has ended.

If at 910 it is determined that the transmit signal has ended, method 900 proceeds to 914. At 914, method 900 includes actuating the T/R switch to a second position (e.g., second position 232) to initiate a receive mode of the ultrasound system. At the second position, a receive signal transmitted via the set of transmit/receive channel wires is received by a receive channel at the console of the ultrasound system. During the receive mode, reflected signals are received at the probe and sent to the console. The reflected signals may arrive at the probe and be transmitted over the transmit/receive channel wires over a duration (e.g., between time t3 and t4 of FIG. 6), depending on a depth of reflecting structures within the patient or scanned object. For example, a first portion of the reflected signals may arrive at a first time of the duration; a second portion of the reflected signals may arrive at a second time of the duration; and so on, until all of the reflected signals have been received at the probe and sent to the console via the set of transmit/receive channel wires.

At 916, method 900 includes determining whether the receive signal is still being transmitted from the probe to the console (e.g., whether the reflected signals are continuing to arrive at the probe). If at 916 it is determined that the reflected signals are still being detected at the probe and the receive signal is still being transmitted, method 900 proceeds to 918. At 918, method 900 includes waiting until the transmission of the receive signal has ended.

If at 916 it is determined that all of the reflected signals have been detected at the probe and the receive signal is no longer being transmitted, method 900 proceeds to 920. At 920, method 900 includes actuating the T/R switch from the second position to the first position, to transmit beam setup data for generating a new transmit signal to the probe via the set of transmit/receive channel wires, to initiate a new transmit/receive cycle. In other words, the T/R switch is operated to advantageously use the set of transmit/receive channel wires to transfer the beam setup data (and other digital data) during a window of time between the end of a receive mode, and the beginning of a subsequent transmit mode, when the set of transmit/receive channel wires are not used to transmit beamforming or ultrasound data. For e4D probes, the beam setup data can also be sent during the transmit mode.

Figure 7:
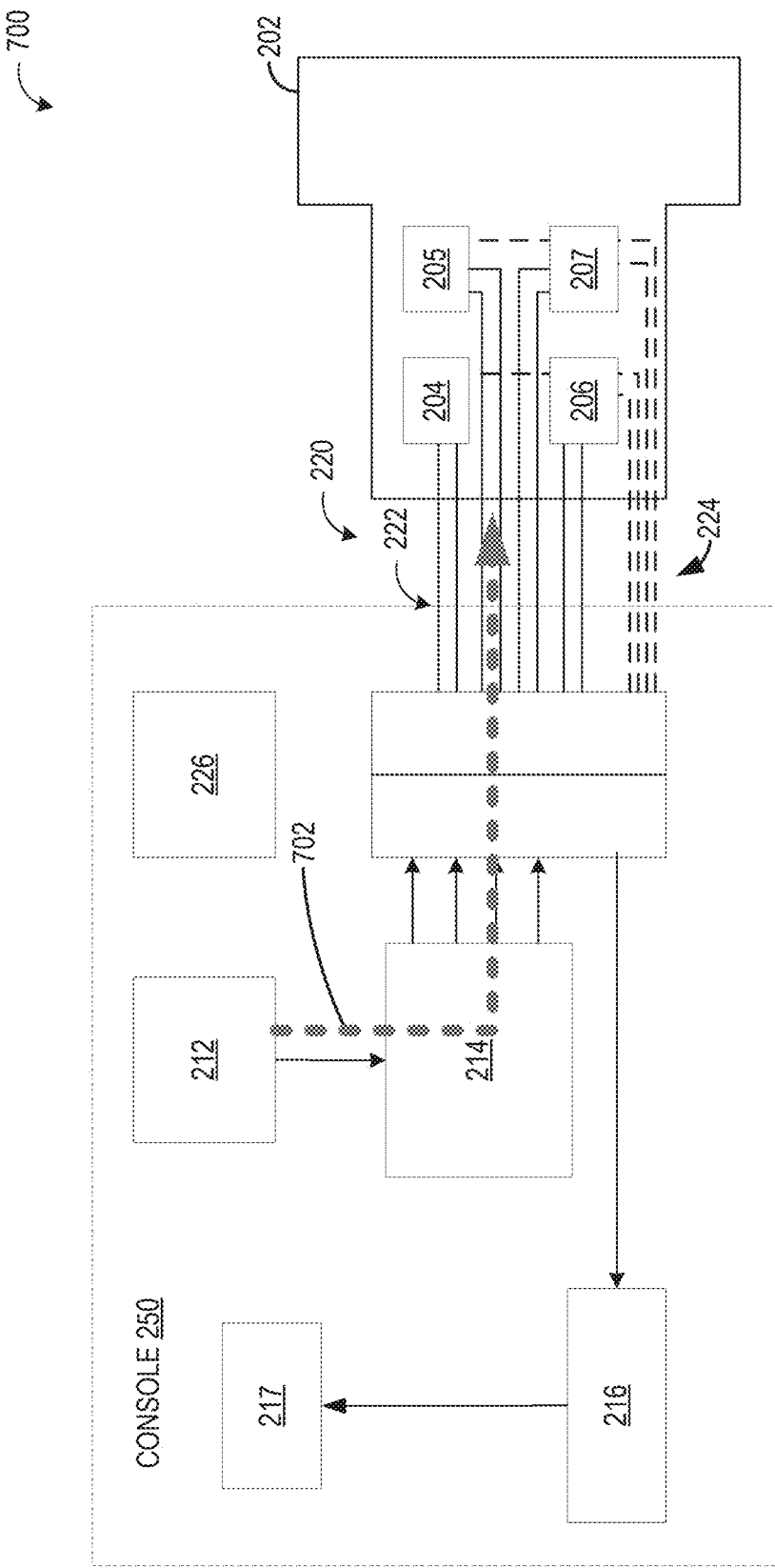
FIG. 7 shows a second exemplary ultrasound probe coupling diagram, depicting a fourth flow of data between the console and the probe.

Referring now to FIG. 7, a second ultrasound probe coupling diagram 700 is shown, which depicts a second, alternative embodiment of ultrasound system 100 where the probe 202 is connected to the console 250. In the second embodiment, the beam setup data and other digital data may be advantageously transmitted from the FPGA 212 to the transmit beamforming electronics (e.g., the ASICs 204-207) via the first set of wires 222 using the Tx generator 214 (e.g., the pulser), as indicated by a dashed line 702.

In other words, for e4D probes, during the transmit mode, the transmit signal is generated by the ASICs 204-207, and not by the Tx generator 214. As a result, the Tx generator 214 may be configured to transmit the beam setup data during the transmit mode. Additionally or alternatively, for both e4D probes and standard probes, the Tx generator 214 may be used to transmit the beam setup data via the first set of wires 222 during a portion of the receive mode after the receive signal has been received, and before a subsequent transmit mode has initiated, as described above in reference to FIG. 6. The Tx generator 214 may be configured to transmit the beam setup data and/or other digital data via pulses of low voltage signals, as described below in reference to FIG. 8. A method for using the Tx generator 214 to transmit the beam setup data and/or other digital data via the pulses of low voltage signals is described below in reference to FIG. 10.

An advantage of the second embodiment shown in FIG. 7 with respect to the first embodiment shown in FIGS. 2-5 is that pulsers already available on the market may be used without modification. However, a disadvantage of the second embodiment over the first embodiment is that using the pulser to generate the digital data may have bandwidth and/or speed limitations, and data transfer rates could be slower.

Figure 8:
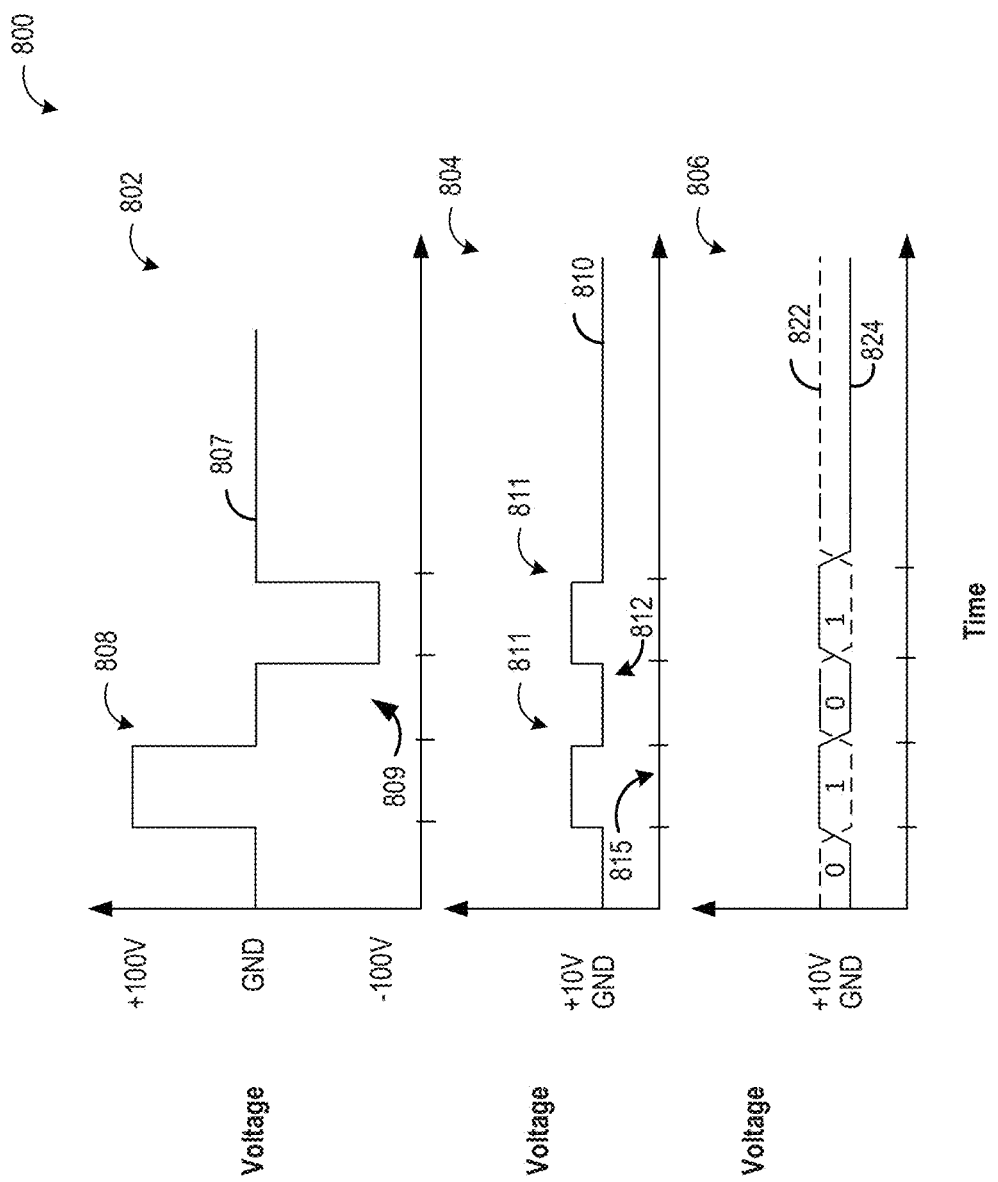
FIG. 8 shows an exemplary encoding of digital data.

FIG. 8 shows a pulser encoding diagram 800, including a first high voltage diagram 802, a second low voltage diagram 804, and a third low voltage diagram 806. The first high voltage diagram 802 includes an exemplary voltage plot 807 indicating a transmission of a transmit signal over time, where the transmit signal may be generated by a pulser (e.g., the Tx generator 214) and transmitted to a standard probe (e.g., the probe 202) during a transmit mode of an ultrasound system, such as the ultrasound imaging system 100 of FIG. 1. The transmit signal of voltage plot 807 is a high voltage signal that may oscillate between a high positive voltage, as shown in a portion 808 of voltage plot 807, and a high negative voltage, as shown in a portion 809 of voltage plot 807. For example, the high positive voltage may be a voltage of up to 200V, and the high negative voltage may be a voltage up to −200V. The transmit signal may be converted into an acoustic wave by a transducer array of the standard probe (e.g., transducer elements 104 of FIG. 1).

The pulser may be configured to send the transmit signal to the probe via a set of transmit/receive channel wires, which may include coaxial cables capable of transmitting signals with high positive and negative voltages. For e4D probes or other probes that include electronics (e.g., ASICs 204-207, in the embodiment shown in FIG. 2) for generating the transmit signal at the probe rather than at the pulser, beam setup data may be transmitted to the probe with instructions for generating the transmit signal, which may be sent via a second set of wires (e.g., the second set of digital data transfer wires 224). However, the pulser may be advantageously configured to send the beam setup data to the probe via the transmit/receive channel wires, rather than the second set of wires. The pulser may have a plurality of outputs, where each output of the plurality of outputs may be connected to a different signal wire of the transmit/receive channel wires. As a result, the beam setup data may be transmitted in parallel over the different signal wires. By doing so, a greater amount of beam setup data and other digital data may be sent to the probe, in a shorter amount of time, without incurring delays due to slow data transfer rates. Additionally, the second set of wires may be eliminated, which may reduce a stiffness, weight, and/or costs of the cable, as well as a cost and a complexity of the ultrasound system.

To protect the electronics of the probe from damage, standard integrated electronics of the pulser may be used to send the beam setup data via a low voltage signal indicated by an exemplary plot 810 of the low voltage diagram 804. The low voltage signal may be a binary signal that transmits digital data comprising ones and zeros by transmitting a low voltage pulse 811 over a predefined time increment 815 to represent a one, and not transmitting the low voltage pulse 811 over the predefined time increment to represent a zero (e.g., at a location 812). In this way, the beam setup data and/or other digital data may be encoded by the pulser for transmission via the transmit/receive channel wires in a way that does not damage the electronics.

One problem with transmitting the low voltage signal in this manner is that in the case of external electromagnetic fields, additional voltages may be generated on a wire transmitting the low voltage signal. As a result of noise caused by the additional voltages, a false state may be detected, where a zero may be interpreted as a one, or vice versa. To address this, an alternative encoding strategy shown in the third low voltage diagram 806 may be used, which relies on a differential data transfer between a first signal 822 (e.g., plot 810) sent on a first wire of the transmit/receive channel wires and a second signal 824 sent on a second wire of the transmit/receive channel wires. The second signal 824 may be an inverted version of the first signal 822. A receiver of the first signal 822 and the second signal 824 (e.g., an ASIC) may calculate a voltage difference between the first signal 822 and the second signal 824 to determine an encoding of ones and zeros based on the difference, to decode the digital data transmitted via the first signal 822 and the second signal 824. In case of external electromagnetic fields which lead to additional voltages on the wires, the additional voltages may be observed on both the first signal 822 and the second signal 824. As a result, the difference between the first signal 822 and the second signal 824 are not affected by the additional voltages, and the external electromagnetic fields do not impact the results. As a result, the alternative encoding strategy based on the differential data transfer may provide a more robust and reliable transfer of data.

Figure 10:
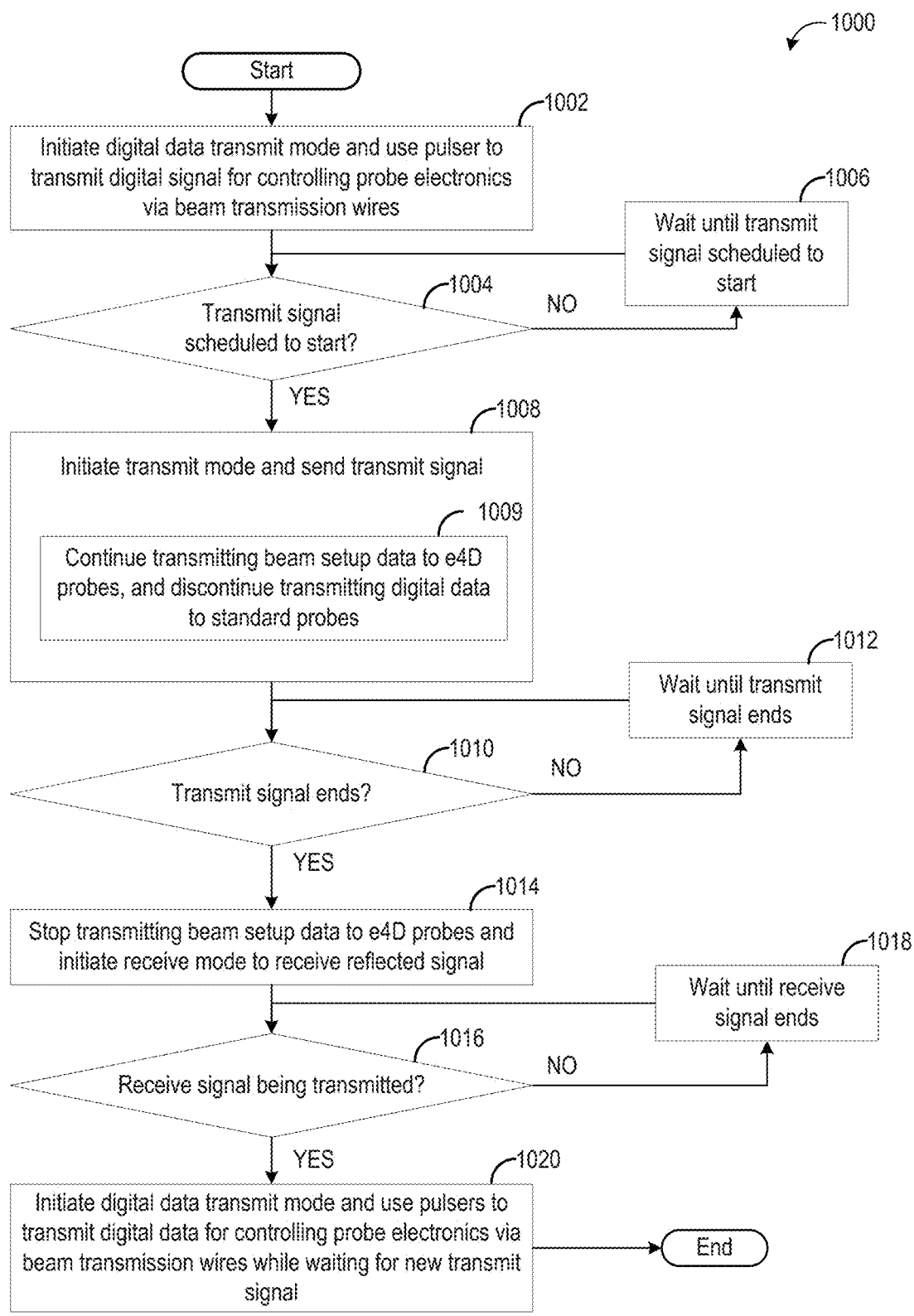
FIG. 10 is a flowchart illustrating a second exemplary method for controlling the flow of data between the console and the probe.

FIG. 10 shows a method 1000 for transmitting beam setup data and/or other digital data via pulses of low frequency signals, to advantageously use a set of transmit/receive channels (e.g., the first set of transmit/receive channel wires 222 of FIG. 2) to transmit the beam setup data and/or other digital data when the transmit/receive channels are not being used. The ultrasound system may be a non-limiting example of the ultrasound system 100 of FIG. 1. Method 1000 may be used when the ultrasound system includes a probe with electronics for generating a transmit signal, such as an e4D probe, where a pulser typically used to generate the transmit signal may not be in use. Method 1000 may also be used when the ultrasound system includes a standard probe without electronics for generating a transmit signal, where the pulser is used to generate the transmit signal and also to generate and transmit digital data such as MUX configuration data, etc. The pulser may be used to generate the pulses of low frequency signals to send the beam setup (and other) data. The steps of method 1000 may also be applied as described above in relation to timing diagram 600 of FIG. 6. In various embodiments, method 1000 may be executed by a processor of the ultrasound system, such as the processor 116 of FIG. 1, and/or an FPGA of the ultrasound system, such as the FPGA 212 of FIG. 2.

Method 1000 begins at 1002, where method 1000 includes initiating a digital data transmit mode and using a pulser (e.g., Tx generator 214) to transmit beam setup data for generating a transmit signal to the probe and other digital data via a set of transmit/receive channel wires typically used for transmit/receive signals to and from the probe. The beam setup data may be converted to a series of pulses by the pulser, as described above in reference to FIG. 8. The beam setup data may be received at beamforming electronics of the probe, such as one or more ASICs (e.g., ASICs 204-207) located in a handle of the probe. The beamforming electronics may process the beam setup data to configure an acoustic transmit signal.

At 1004, method 1000 includes determining whether a transmit signal is scheduled to start. The transmit signal may be scheduled to start at predetermined intervals of a transmit/receive cycle during operation of the ultrasound system. If at 1004 it is determined that the transmit signal is not scheduled to start, method 1000 proceeds to 1006. At 1006, method 1000 includes waiting until the transmit signal is scheduled to start.

If at 1004 it is determined that the transit signal is scheduled to start, method 1000 proceeds to 1008. At 1008, method 1000 includes initiating a beam transmit mode, and initiating a transmission of a transmit signal from the probe to a body of a patient or scanned object. With e4D probes, the transmit signal may be generated at the probe based on the beam setup data. With standard probes, the transmit signal may be generated by the pulser and sent to the probe via the transmit/receive channel wires.

At 1009, method 1000 may include continuing to transmit the beam setup data and other digital data to e4D probes via the set of transmit/receive channel wires, while the transmit signal is being generated by the electronics of the probe. However, for standard probes, where the pulser may be used to generate the transmit signal, method 1000 includes discontinuing transmission of the other digital data to the probe via the set of transmit/receive channel wires, and allowing the transit signal to be generated by the pulser and transmitted to the probe via the set of transmit/receive channel wires.

At 1010, method 1000 includes determining whether the transmit signal has ended. If at 1010 it is determined that the transmit signal has not ended, method 1000 proceeds to 1012. At 1012, method 1000 includes waiting until the transmission of the transmit signal has ended.

If at 1010 it is determined that the transmit signal has ended, method 1000 proceeds to 1014. At 1014, method 1000 includes stopping transmitting the beam setup data to the probe via the transmit/receive channel wires, and initiating a receive mode of the ultrasound system. During the receive mode, a receive signal is transmitted from the probe via the set of transmit/receive channel wires and is received by a receive channel at the console of the ultrasound system. During the receive mode, reflected signals are received at the probe and sent to the console. The reflected signals may arrive at the probe and be transmitted over the transmit/receive channel wires over a duration (e.g., between time t3 and t4 of FIG. 6), depending on a depth of reflecting structures within the patient or scanned object. For example, a first portion of the reflected signals may arrive at a first time of the duration; a second portion of the reflected signals may arrive at a second time of the duration; and so on, until all of the reflected signals have been received at the probe and sent to the console via the set of transmit/receive channel wires.

At 1016, method 1000 includes determining whether the receive signal is still being transmitted from the probe to the console (e.g., whether the reflected signals are continuing to arrive at the probe). If at 1016 it is determined that the reflected signals are still being detected at the probe and the receive signal is still being transmitted, method 1000 proceeds to 1018. At 1018, method 1000 includes waiting until the transmission of the receive signal has ended.

If at 1016 it is determined that all of the reflected signals have been detected at the probe and the receive signal is no longer being transmitted, method 1000 proceeds to 1020. At 1020, method 1000 includes initiating the digital data transmit mode, and using the pulser to transmit beam setup data for generating a new transmit signal to the probe via the set of transmit/receive channel wires, to initiate a new transmit/receive cycle. In this way, the pulser may be operated to advantageously use the set of transmit/receive channel wires to transfer the beam setup data (and other digital data) to the probe, during the transmit mode (for e4D probes) and/or during a window of time between the end of a receive mode and the beginning of a subsequent transmit mode (for both standard probes and e4D probes), when the set of transmit/receive channel wires are not used to transmit beamforming or ultrasound data.

Thus, methods and systems are disclosed that may increase a data transfer rate of digital data from a console of an ultrasound system to a probe of the ultrasound system and from the probe to the ultrasound system. The digital data includes beam setup data used by modern e4D probes to control electronics for generating a transmit signal, and other digital data used by the probe, such as MUX configuration data and/or sensor data of the probe. The data transfer rate may be increased by using transmit/receive channels of a cable coupling the probe to the console to send the digital data, when transmit and receive signals are not being sent via the transmit/receive channels. In particular, the digital data may be transmitted during a window of time at the end of a receive mode, after the receive signal has been received from a first transmit/receive cycle, and prior to initiating a transmit signal of a subsequent transmit/receive cycle. Additionally, for e4D probes, the digital data may be transmitted during the transmit mode, when the transmit/receive channels are not used. In some embodiments, a T/R switch used to switch between the transmit mode and the receive mode may be configured to include a third position, where when the T/R switch is in the third position, the digital data is transmitted via the transmit/receive channels, using a low voltage signal to prevent damage to the probe electronics. In other embodiments, the pulser of the ultrasound system may be advantageously used to encode and transmit the digital data. By transmitting the digital data to the probe via the transmit/receive channels, rather than a separate, dedicated set of wires, a greater amount of beam setup data and other digital data may be sent to the probe, in a shorter amount of time. As a result, delays due to slow data transfer rates may be averted, and transfers of a greater amount of digital data used by next generation ASICs may be facilitated. Additionally, the separate, dedicated wires may be eliminated, which may decrease a weight of the cable and increase a flexibility of the cable, and reduce a cost and a complexity of the ultrasound system. The technical effect of using the transmit/receive channels to send the digital data rather than the separate, dedicated wires is that an amount of digital data transferred between the console and the probe and a data transfer rate may be increased, and the cost and complexity of the ultrasound system may be reduced.

The disclosure also provides support for an ultrasound system, comprising: a console including a pulser and a controller, an ultrasound probe coupled to the console via a cable, the cable including a set of transmit/receive channel wires configured to transmit a transmit signal from the pulser to the ultrasound probe during a transmit mode of the ultrasound system, and to transmit a receive signal from the ultrasound probe to the console during a receive mode of the ultrasound system, and a non-transitory memory storing instructions that when executed, cause the controller to transmit digital data between the console and the ultrasound probe via the set of transmit/receive channel wires at a time when neither the transmit signal nor the receive signal are being transmitted. In a first example of the system, the digital data includes at least one of: instructions for configuring a multiplexer of the ultrasound probe, sensor data of the ultrasound probe, and beam setup data comprising instructions for generating the transmit signal at the ultrasound probe. In a second example of the system, optionally including the first example, the ultrasound probe is one of: a standard probe not including electronics for generating the transmit signal at the ultrasound probe, and the time includes a first duration at an end of the receive mode after the receive signal has been received, and a probe including electronics for generating the transmit signal at the ultrasound probe, and the time includes at least one of the first duration at the end of the receive mode, and a second duration during the transmit mode. In a third example of the system, optionally including one or both of the first and second examples, the system further comprises: a transmit/receive (T/R) switch, wherein further instructions are stored in the non-transitory memory that when executed, cause the controller to: actuate the T/R switch to a first position to transmit the digital data from the console to the probe via the set of transmit/receive channel wires, actuate the T/R switch to a second position to receive the receive signal from the probe via the set of transmit/receive channel wires, and actuate the T/R switch to a third position to transmit the transmit signal from the pulser to the probe via the set of transmit/receive channel wires. In a fourth example of the system, optionally including one or more or each of the first through third examples, the ultrasound probe is a standard probe, and further instructions are stored in the non-transitory memory that when executed, cause the controller to actuate the T/R switch to the third position during the transmit mode. In a fifth example of the system, optionally including one or more or each of the first through fourth examples, the ultrasound probe includes electronics for generating the transmit signal at the ultrasound probe, and further instructions are stored in the non-transitory memory that when executed, cause the controller to actuate the T/R switch to the first position during the transmit mode. In a sixth example of the system, optionally including one or more or each of the first through fifth examples, further instructions are stored in the non-transitory memory that when executed, cause the controller to: actuate the T/R switch to the first position to transmit the digital data at an end of the receive mode and prior to a subsequent transmit mode. In a seventh example of the system, optionally including one or more or each of the first through sixth examples, the digital data is transmitted over the set of transmit/receive channel wires via a low-voltage signal. In a eighth example of the system, optionally including one or more or each of the first through seventh examples, further instructions are stored in the non-transitory memory that when executed, cause the controller to transmit the digital data to the ultrasound probe via a binary signal generated by the pulser, the binary signal transmitting the digital data by transmitting a low voltage pulse over a predefined time increment to represent a one, and not transmitting the low voltage pulse over the predefined time increment to represent a zero. In a ninth example of the system, optionally including one or more or each of the first through eighth examples, the binary signal includes a first binary signal transmitted via a first wire of the set of transmit/receive channel wires, and a second binary signal transmitted via a second wire of the set of transmit/receive channel wires, the second binary signal an inverted version of the first binary signal, and decoding the binary signal includes determining a differential data transfer between the first binary signal and the second binary signal.

The disclosure also provides support for a method for an ultrasound system, the method comprising: during a time when neither a transmit signal nor a receive signal of the ultrasound system are being transmitted via a set of transmit/receive channel wires within a cable coupling a probe of the ultrasound system to a console of the ultrasound system, transmitting digital data between the console and the probe via the set of transmit/receive channel wires. In a first example of the method, the digital data includes at least instructions for configuring a multiplexer of the probe and/or sensor data of the probe. In a second example of the method, optionally including the first example, the time includes a duration at an end of a receive mode of a transmit/receive cycle of the ultrasound system after the receive signal has been received. In a third example of the method, optionally including one or both of the first and second examples, the probe includes electronics for generating the transmit signal at the probe, and the digital data includes beam setup data used to control the electronics. In a fourth example of the method, optionally including one or more or each of the first through third examples, the time includes a duration during a transmit mode of a transmit/receive cycle of the ultrasound system. In a fifth example of the method, optionally including one or more or each of the first through fourth examples, the method further comprises: actuating a transmit/receive (T/R) switch of the console to a first position to transmit the digital data from the console to the probe via the set of transmit/receive channel wires, actuating the T/R switch to a second position to receive the receive signal from the probe via the set of transmit/receive channel wires, and actuating the T/R switch to a third position to transmit a transmit signal from the console to the probe via the set of transmit/receive channel wires. In a sixth example of the method, optionally including one or more or each of the first through fifth examples, the method further comprises: transmitting the digital data from the console to the probe via low-voltage pulses generated by a pulser of the ultrasound system. In a seventh example of the method, optionally including one or more or each of the first through sixth examples, the method further comprises: transmitting a first binary signal including the low-voltage pulses via a first wire of the set of transmit/receive channel wires, transmitting a second binary signal including the low-voltage pulses via a second wire of the set of transmit/receive channel wires, the second binary signal an inverted version of the first binary signal, and decoding the digital data by determining a difference in voltage between the first binary signal and the second binary signal.

The disclosure also provides support for a method for an ultrasound system including a probe having electronics to generate a transmit signal, the method comprising: during a transmit mode of the ultrasound system and/or during a portion of a receive mode of the ultrasound system after a receive signal has been received from the probe, using a set of transmit/receive channel wires configured to send a transmit signal from a pulser of the ultrasound system to the probe, to transmit digital beam setup data to the probe, the digital beam setup data including instructions for generating the transmit signal at the probe. In a first example of the method, the method further comprises: at least one of: transmitting the digital beam setup data via a low-voltage binary signal generated at the pulser, and transmitting the digital beam setup data from a field programmable gate array (FPGA) of the ultrasound system to the probe via a transmit/receive (T/R) switch used to switch between the transmit mode and the receive mode, the T/R switch including a position for a digital data transmit mode during which the digital beam setup data is transmitted to the probe via the set of transmit/receive channel wires.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative and should not be construed to be limiting in any manner.

The invention claimed is:

1. An ultrasound system, comprising:
   a console including a pulser and a controller;
   an ultrasound probe coupled to the console via a cable, the cable including a set of transmit/receive channel wires configured to transmit a transmit signal from the pulser to the ultrasound probe during a transmit mode of the ultrasound system, and to transmit a receive signal from the ultrasound probe to the console during a receive mode of the ultrasound system; and
   a non-transitory memory storing instructions that when executed, cause the controller to transmit digital data between the console and the ultrasound probe via the set of transmit/receive channel wires at a time when neither the transmit signal nor the receive signal is being transmitted;
   wherein the digital data includes at least one of:
     instructions for configuring a multiplexer of the ultrasound probe;
     sensor data of the ultrasound probe; and
     beam setup data comprising instructions for generating the transmit signal at the ultrasound probe; and
   wherein the digital data is transmitted to the ultrasound probe via a binary signal generated by the pulser, the binary signal transmitting the digital data by transmitting a low voltage pulse over a predefined time increment to represent a one, and not transmitting the low voltage pulse over the predefined time increment to represent a zero.

2. The ultrasound system of claim 1, wherein the ultrasound probe is one of:
   a standard probe not including electronics for generating the transmit signal at the ultrasound probe, and the time includes a first duration at an end of the receive mode after the receive signal has been received; and
   a probe including electronics for generating the transmit signal at the ultrasound probe, and the time includes at least one of the first duration at the end of the receive mode, and a second duration during the transmit mode.

3. The ultrasound system of claim 1, further comprising a transmit/receive (T/R) switch, wherein further instructions are stored in the non-transitory memory that when executed, cause the controller to:
   actuate the T/R switch to a first position to transmit the digital data from the console to the probe via the set of transmit/receive channel wires;
   actuate the T/R switch to a second position to receive the receive signal from the probe via the set of transmit/receive channel wires; and
   actuate the T/R switch to a third position to transmit the transmit signal from the pulser to the probe via the set of transmit/receive channel wires.

4. The ultrasound system of claim 3, wherein the ultrasound probe is a standard probe, and further instructions are stored in the non-transitory memory that when executed, cause the controller to actuate the T/R switch to the third position during the transmit mode.

5. The ultrasound system of claim 3, wherein the ultrasound probe includes electronics for generating the transmit signal at the ultrasound probe, and further instructions are stored in the non-transitory memory that when executed, cause the controller to actuate the T/R switch to the first position during the transmit mode.

6. The ultrasound system of claim 5, wherein further instructions are stored in the non-transitory memory that when executed, cause the controller to:
   actuate the T/R switch to the first position to transmit the digital data at an end of the receive mode and prior to a subsequent transmit mode.

7. An ultrasound system, comprising:
   a console including a pulser and a controller;
   an ultrasound probe coupled to the console via a cable, the cable including a set of transmit/receive channel wires configured to transmit a transmit signal from the pulser to the ultrasound probe during a transmit mode of the ultrasound system, and to transmit a receive signal from the ultrasound probe to the console during a receive mode of the ultrasound system; and
   a non-transitory memory storing instructions that when executed, cause the controller to transmit digital data between the console and the ultrasound probe via the set of transmit/receive channel wires at a time when neither the transmit signal nor the receive signal is being transmitted, the digital data transmitted to the ultrasound probe via a binary signal generated by the pulser, the binary signal transmitting the digital data by transmitting a low voltage pulse over a predefined time increment to represent a one, and not transmitting the low voltage pulse over the predefined time increment to represent a zero.

8. The ultrasound system of claim 7, wherein the binary signal includes a first binary signal transmitted via a first wire of the set of transmit/receive channel wires, and a second binary signal transmitted via a second wire of the set of transmit/receive channel wires, the second binary signal an inverted version of the first binary signal, and decoding the binary signal includes determining a differential data transfer between the first binary signal and the second binary signal.

9. A method for an ultrasound system, the method comprising:
during a time when neither a transmit signal nor a receive signal of the ultrasound system are being transmitted via a set of transmit/receive channel wires within a cable coupling a probe of the ultrasound system to a console of the ultrasound system, transmitting digital data between the console and the probe via the set of transmit/receive channel wires via low-voltage pulses generated by a pulser of the ultrasound system;
wherein transmitting the digital data via the low-voltage pulses further comprises:
transmitting a first binary signal including the low-voltage pulses via a first wire of the set of transmit/receive channel wires;
transmitting a second binary signal including the low-voltage pulses via a second wire of the set of transmit/receive channel wires, the second binary signal an inverted version of the first binary signal; and
decoding the digital data by determining a difference in voltage between the first binary signal and the second binary signal.

10. The method of claim 9, wherein the digital data includes at least instructions for configuring a multiplexer of the probe and/or sensor data of the probe.

11. The method of claim 9, wherein the time includes a duration at an end of a receive mode of a transmit/receive cycle of the ultrasound system after the receive signal has been received.

12. The method of claim 9, wherein the probe includes electronics for generating the transmit signal at the probe, and the digital data includes beam setup data used to control the electronics.

13. The method of claim 12, wherein the time includes a duration during a transmit mode of a transmit/receive cycle of the ultrasound system.

14. The method of claim 9, further comprising:
actuating a transmit/receive (T/R) switch of the console to a first position to transmit the digital data from the console to the probe via the set of transmit/receive channel wires;
actuating the T/R switch to a second position to receive the receive signal from the probe via the set of transmit/receive channel wires; and
actuating the T/R switch to a third position to transmit a transmit signal from the console to the probe via the set of transmit/receive channel wires.

15. The method of claim 14, further comprising:
transmitting the digital beam setup data from a field programmable gate array (FPGA) of the ultrasound system to the probe via the transmit/receive (T/R) switch.

* * * * *